United States Patent [19]
Holst

[11] 3,989,125
[45] Nov. 2, 1976

[54] ANTI-LOCKING CONTROL ARRANGEMENT
[76] Inventor: Jan-Olov Martin Holst, Skogsduvevagen 14, S-75252 Uppsala, Sweden
[22] Filed: Feb. 4, 1976
[21] Appl. No.: 655,222

[30] Foreign Application Priority Data
Feb. 19, 1975 Sweden.............................. 7501881

[52] U.S. Cl. ............................ 188/181 A; 303/61; 303/21 FP
[51] Int. Cl.² ......................................... B60T 8/087
[58] Field of Search ............ 188/181 A; 303/21 CG, 303/61, 115, 116, 119

[56] References Cited
UNITED STATES PATENTS
3,833,097  9/1974  Holst.............................. 188/181 A
3,951,465  4/1976  Stage .................................. 303/116

Primary Examiner—Duane A. Reger
Attorney, Agent, or Firm—Bell, Seltzer, Park & Gibson

[57] ABSTRACT

An improved anti-locking control of the type having a conduit through which hydraulic pressure is applied, a valve interposed in the conduit for controllably interrupting and releasing the application of pressure and an oscillating mass-spring actuator for the valve. In accordance with one aspect of this invention, reduction in braking force is carried out in a series of steps. In accordance with another aspect of the present invention, oscillation of the actuator mass is substantially limited to no more than a maximum amplitude. In each instance, greater efficiency is achieved in the use of energy required for operation of the anti-locking control.

10 Claims, 8 Drawing Figures

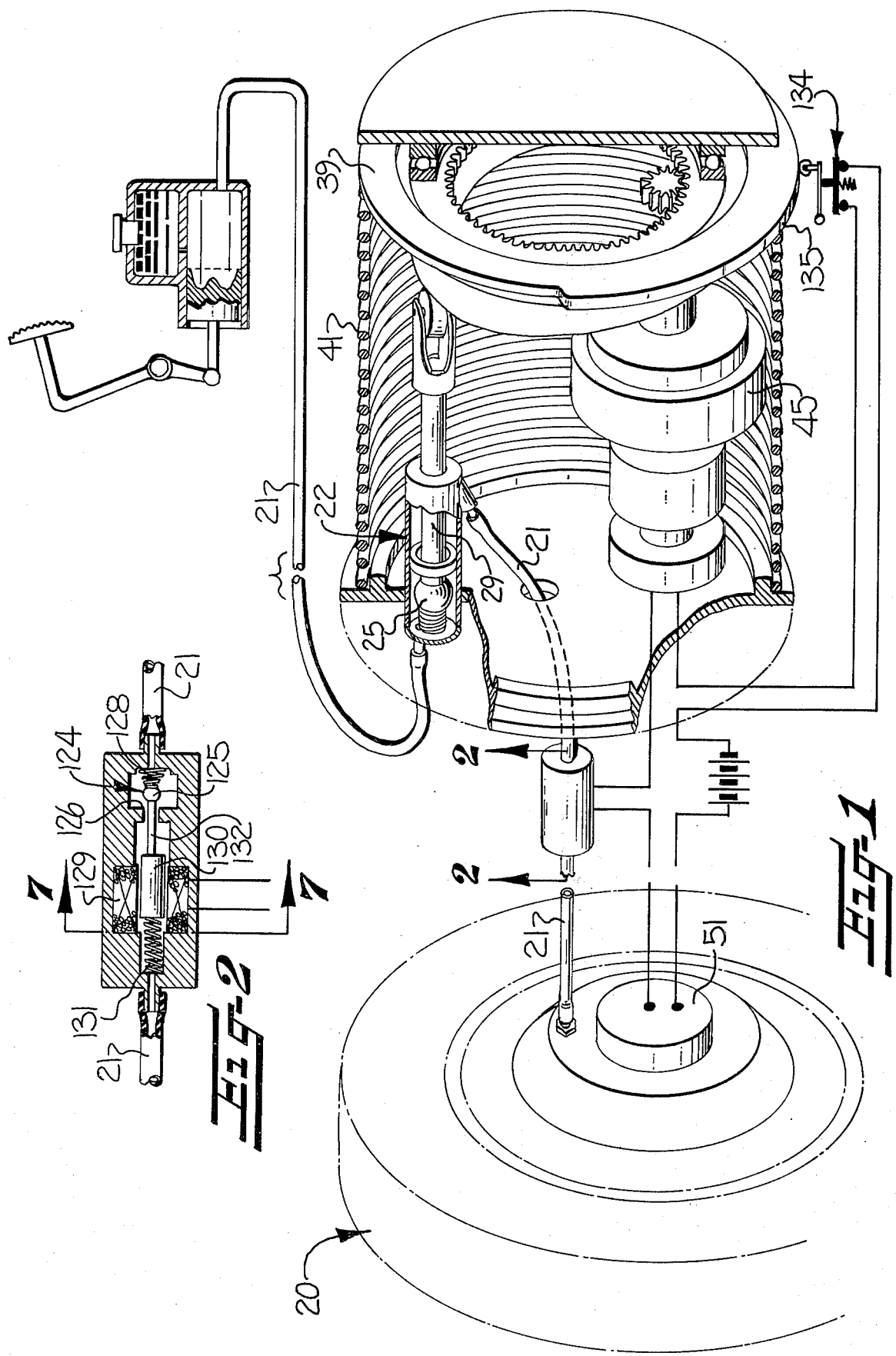

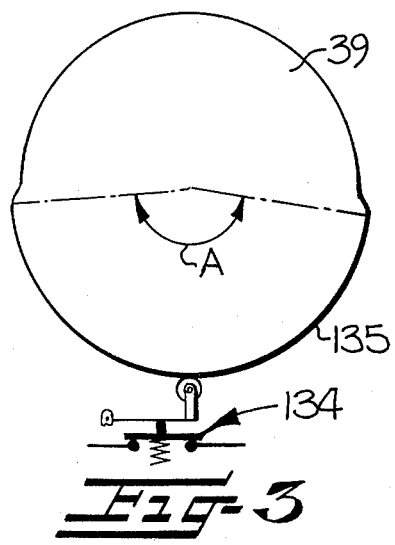
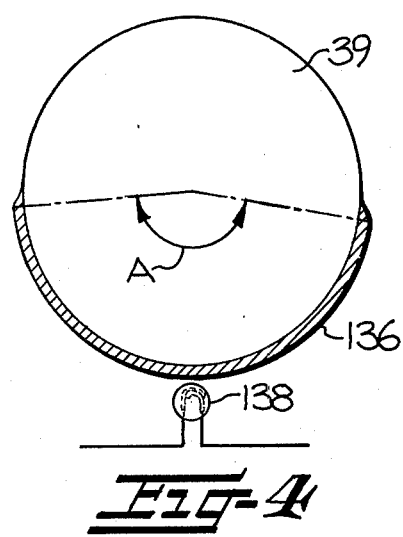
Fig-3 Fig-4
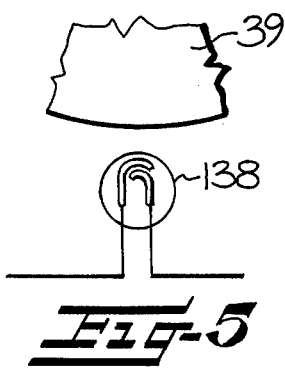
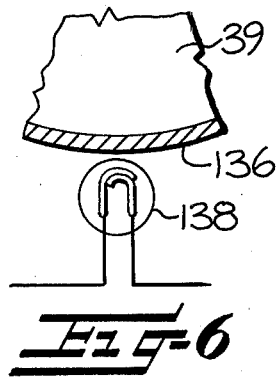
Fig-5 Fig-6
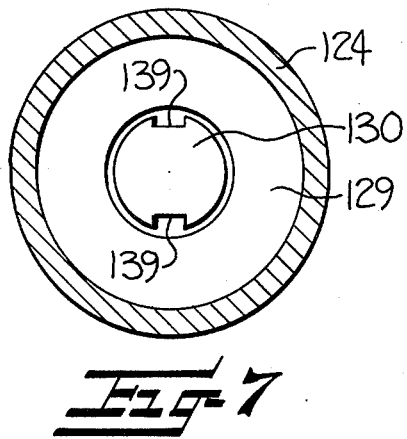
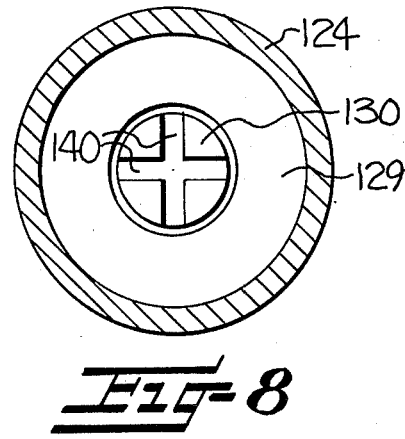
Fig-7 Fig-8

ANTI-LOCKING CONTROL ARRANGEMENT

This invention is an improvement upon the arrangement of prior Holst U.S. Pat. No. 3,833,097, to which interested readers are referred. The disclosure made in that prior U.S. patent is, to any extent deemed necessary for a full understanding of the present invention, hereby incorporated by reference into this specification.

The phenomenon known as "locking" in the application of brakes for slowing rotation of a rotating member and the use of anti-lock controls has been known heretofore. Specific examples of the difficulties and dangers in locking of brakes and of devices for overcoming those difficulties and dangers are set forth in Holst U.S. Pat. No. 3,833,097. One acceptable solution for the difficulties and dangers of brake locking has been set forth in the aforementioned Holst patent, to which the present invention is an improvement. While the suitability of such a solution has been recognized, it has also been recognized that anti-lock controls of any type require energy for operation and thus represent, to greater or lesser extent, burdens on the vehicle or other arrangement with which the anti-lock controls are used.

It is an object of the present invention to improve the efficiency of an anti-lock control for fluid pressure actuated brakes. In realizing this object of the present invention, at least two approaches are used. First, pressure at a brake cylinder is reduced in a stepwise manner, so as to reduce the consumption of energy in repressurizing of hydraulic fluid by the anti-lock control. Second, some limitation is imposed upon the oscillatory amplitude of an actuator mass so as to reduce the expenditure of energy in driving the mass in oscillation.

Some of the objects of the invention having been stated, other objects will appear as the description proceeds, when taken in connection with the accompanying drawings, in which:

FIG. 1 is a partly schematic, partly perspective and partly sectional view of a hydraulic pressure actuated brake arrangement in accordance with the present invention;

FIG. 2 is an enlarged elevation view, in section, of a portion of the arrangement of FIG. 1, taken generally along the line 2—2 in that Figure;

FIG. 3 is a schematic elevation view of certain elements of the arrangement of FIG. 1;

FIG. 4 is a view similar to FIG. 3, illustrating a modified form of the anti-lock control of the present invention;

FIG. 5 is an enlarged view generally similar to FIG. 4, illustrating one state of operation of an anti-lock control in accordance with the present invention;

FIG. 6 is a view similar to FIG. 5, illustrating another state of operation;

FIG. 7 is an enlarged section view through the portion of the arrangement of FIG. 2, taken generally along the line 7—7 in that Figure; and FIG. 8 is a view similar to FIG. 7, showing a modified form of the structure shown in FIGS. 2 and 7.

The description incorporated by reference hereinto and which follows, and the illustrations to which reference is had thereby, are contemplated as instructing persons skilled in the applicable arts regarding the practice of this invention. However, it is to be realized at the outset that the present invention is subject to modification and change in varying ways and that the description and illustrations are accordingly to be taken broadly and not understood as limiting on the scope of this invention.

Referring more particularly to the accompanying drawings, a fluid pressure actuated brake is illustrated schematically in FIG. 1 for slowing a rotating member such as a wheel 20 of an automotive vehicle. Many elements of the arrangement shown in FIG. 1 will be recognized on a comparison of that figure with the arrangement of prior Holst U.S. Pat. No. 3,833,097.

As disclosed in that prior related United States patent, a hydraulic pressure actuated brake arrangement for slowing a rotating member such as a wheel 20 of an automotive vehicle may have an anti-lock control including a conduit 21 through which actuating pressure is applied, a valve (generally indicated at 22) interposed in the conduit 21 for controllably interrupting and releasing the application of pressure, an oscillating mass-spring actuator for the valve, and a sensor 51 which responds to the occurrence of an excessive rate of retardation of the rotating member 20 by initiating operation of the actuator for the valve 22. The oscillating mass-spring actuator includes a mass comprising a flywheel 39 and elements connected therewith, and a spring means 41. The actuator mass 39 is operatively connected with a motive means 45, preferably in the form of an electrical motor, for exertion on the mass 39 of a force tending to rotate the mass 39 through a range of oscillatory amplitudes.

As described more fully in the aforementioned related prior United States patent, an occurrence of an excessive rate of retardation of the wheel 20 or excessive wheel slip results in energization of the motive means 45, oscillation of the mass 39 through an increasing range of oscillatory amplitudes, and actuation of the valve 22 for blocking further increase in hydraulic pressure transmitted through the conduit 21 while releasing braking forces exerted by the brake cylinder to which fluid is delivered.

The present invention contemplates improvement of the previously known arrangements by the incorporation of a second valve, generally indicated at 124 (FIG. 2) and enclosed within a housing inserted in the conduit 21 (FIGS. 1 and 2). The second valve 124 is interposed in the conduit 21 intermediate the first valve 22 and the brake for the wheel 20. Being so positioned, the second valve 124 may also be referred to as being downstream of the first valve 22. In the form illustrated, the second valve 124 includes a ball valve member 125, a seat 126 within the housing for receiving the ball valve member 125, and a spring 128 biasing the valve member 125 toward the seat 126.

The housing additionally contains means for normally maintaining the second valve 124 in pressure conducting condition, which means is operatively connected with the sensor 51 for respondinng to the occurrence of an excessive rate of retardation of the rotating member by conditioning or controlling the second valve 124 to block conduction to the brake of increased fluid pressure. In the particular form illustrated, the valve conditioning means comprises solenoid means including a winding 129 encircling an armature member 130 movable axially within the housing against the force of a biasing spring 131 and in response to energization of the winding 129. Extending axially from the armature 130 is a pin 132 which extends beyond the valve seat 126 to operate the valve 124. The relative force of the biasing springs 128, 131 respectively acting on the valve member 126 and the armature 130 is such that the valve member is normally maintained out of engagement with the valve seat. The second valve 124 thus functions as a controllable check valve which will always permit free flow of hydraulic fluid from the wheel toward the master cylinder, but which blocks flow in the reverse direction when the winding 129 is energized as described hereinafter.

In accordance with the present invention, the winding 129 is energized during the same time as energization of the motive means 45 of the anti-lock control, giving rise to a magnetic field which exerts forces on the armature 130 which overcome the biasing force of the spring 131 in engagement therewith. As a result, the armature 130 is displaced axially of the valve 124 (to the left in FIG. 2) permitting the valve member 125 to be moved into engagement with the valve seat 126 in response to the biasing force of the spring 128 and the pressure of hydraulic fluid exerted thereagainst. Upon the sensor 51 de-energizing the motive means 45, the second valve 124 returns to the normal, bi-directional flow condition.

Upon energization of the motive means 45, and as described more fully in the aforementioned related prior United States patent, the mass 39 begins oscillatory movement. The mass 39 initially oscillates through less than the desired maximum displacement, with the extent of oscillation increasing on successive half cycles until a desired maximum is obtained.

In accordance with the present invention, limitation of the maximum amplitude obtained is accomplished by amplitude restricting means, preferably in the form of means interposed between the motive means 45 and the sensor 51 for interrupting the exertion of force by the motive means in response to the amplitude of oscillation of the mass 39 reaching a limiting maximum amplitude. More particularly, the amaplitude restricting means preferably takes the form of an electrical switch generally indicated at 134 which is responsive to the oscillatory position of the mass 39. In accordance with one form of the present invention, the electrical switch 134 (FIGS. 1 and 3) may physically contact a cam lobe 135 extending from the mass 39 over an arc A corresponding to the desired maximum amplitude of oscillation of the mass.

In accordance with a modified form of the present invention (FIGS. 4–6), the mass 39 may be provided with a magnetized arcuate portion 136 which acts upon a reed switch 138 positioned closely adjacent the mass 39 but out of physical contact therewith. As will be understood, oscillation of the mass 39 to a position where the magnetic portion 136 is displaced from the switch 138 (FIG. 5) will result in the switch contacts opening. Similarly, oscillation of the mass 39 through a desired amplitude will cause the magnetized portion 136 to pass adjacent the switch 138, maintaining the contacts thereof closed (FIG. 6). A further modified form (not shown) may provide the mass 39 with a magnetized portion which acts on a normally closed reed switch to open the switch upon the mass reaching the limiting maximum amplitude. This further modified form has the advantage of failing safe in the event the magnetized portion loses magnetism or separates from the mass.

With any of the forms of amplitude restricting means described hereinabove, the motive means 45 is de-energized upon the mass 39 reaching the maximum amplitude permitted so as to protect the spring 41 against fatigue failure and conserve energy. As will be appreciated, continuance of signalling by the sensor 51 will result in energization of the motive means 45 being switched by the changes in conductive state of the amplitude restricting electrical switch 134, 138.

In order to assure free flow of brake fluid through the housing enclosing the second valve means 124, it is desirable that the armature 130 be provided with grooves or slots to facilitate brake fluid flow. Two arrangements of such slots are illustrated in FIGS. 7 and 8, which are sectional views through the housing 124 as indicated in FIG. 2. In FIG. 7, the armature 130 has been provided with a pair of longitudinally extending grooves 139. In FIG. 8, the armature 130 has been provided with radially directed cross cut grooves 140 extending across the rear face thereof so as to facilitate radial flow of hydraulic fluid relative to the armature 130.

As will be appreciated from a study of the aforementioned prior Holst patent, the first valve 22, when actuated by the mass-spring actuator, functions as a partial pump in releasing fluid pressure from the brake and subsequently repressurizing the fluid during each oscillation of the mass. As will be apparent, such repressurization and mass oscillation consume energy. With the insertion of the second valve 124 which functions as a controllable check valve, repressurization requirements are reduced, master cylinder pressure is blocked from reaching the wheel brake and the braking pressure is lowered in a stepwise fashion. Stepwise reduction results in part from alternate opening and closing of the second valve 124 allowing brake fluid to leave, but not return to, the brake. When the first valve 22 is operated (by movement of an actuating pin 29 to the right in FIG. 1 ), the pressure in the conduit 21 is reduced after seating of a ball member 25, thereby withdrawing fluid from the brake through the second valve 124. Additionally, oscillatory amplitudes of the mass, when limited in accordance with this invention, contribute to reduction of repressurization requirements.

A significant advantage obtained by the improved arrangement of this invention is the adaptation of a single size of anti-lock control to a range of vehicles. The prior Holst arrangement essentially reduces fluid pressure to a minimum and restores full pressure during each cycle of oscillation of the mass, thus requiring that the anti-lock control be matched to the capacities of the particular brake system. Stepwise reduction as afforded by the two controllable check valves 22, 124 of the present invention renders such matching unnecessary.

In the drawings and specification, there has been set forth a preferred embodiment of the invention, and although specific terms are employed, they are used in a generic and descriptive sense only and not for purposes of limitation.

That which is claimed is:

1. In a hydraulic pressure actuated brake for slowing a rotating member and having an anti-lock control including a conduit through which pressurized hydraulic fluid is supplied to a brake, a first valve interposed in the conduit for controllably interrupting and releasing the application of pressure, an oscillating mass-spring actuator for the first valve, and a sensor which responds to the occurrence of an excessive rate of retardation of the rotating member by initiating operation of the actuator and first valve, that improvement which comprises a second valve interposed in the conduit intermediate the first valve and the brake, and means for normally maintaining said second valve in pressure conducting condition and operatively connected with the sensor for responding to the occurrence of an excessive rate of retardation of the rotating member by conditioning said second valve to block conduction to the brake of increased fluid pressure while allowing ydraulic fluid to flow away from the brake through said second valve.

2. Apparatus according to claim 1 wherein said second valve comprises a valve member, a valve seat for receiving said valve member in pressure blocking engagement, and biasing means urging said valve member into engagement with said valve seat, and further wherein said valve conditioning means comprises means for engaging said valve member and for opposing said biasing means so as to normally hold said valve member in spaced relation to said valve seat, and means responsive to the sensor for displacing said opposing means.

3. Apparatus according to claim 2 wherein said sensor responsive means comprises solenoid means movable relative to said valve seat, and said means for engaging said valve member comprises pin means extending from said solenoid means.

4. Apparatus according to claim 1 wherein the oscillating mass-spring actuator has a mass movable through a range of oscillatory amplitudes and further comprising amplitude restricting means for limiting the maximum amplitude of oscillation of the mass.

5. Apparatus according to claim 1 wherein the anti-lock control further includes motive means for exerting on the mass-spring actuator forces tending to move the actuator mass through a range of oscillatory amplitudes, the motive means normally being operatively connected to the sensor for exerting force in response to occurrences of an excessive rate of retardation, and further comprising means interposed between the motive means and the sensor for interrupting the exertion of force by the motive means in response to the amplitude of oscillation of the mass reaching a limiting maximum amplitude.

6. Apparatus according to claim 5 wherein the motive means comprises an electrical motor and said force interrupting means comprises electrical switch means electrically connected with the electrical motor for de-energizing the motor upon the amplitude of oscillation of the mass reaching the limiting maximum amplitude.

7. Apparatus according to claim 6 wherein said electrical switch means comprises magnetically actuated switch elements mounted adjacent the oscillatory path of the mass and further wherein the mass has magnetic means for actuating said switch elements.

8. In a hydraulic pressure actuated brake for slowing a rotating member and having an anti-lock control including a conduit through which pressurized hydraulic fluid is supplied to a brake cylinder, a valve interposed in the conduit for controllably interrupting and releasing the application of pressure, an oscillating mass-spring actuator for the valve, a motive means for exerting on the mass-spring actuator forces tending to move the actuator mass through a range of oscillatory amplitudes, and a sensor which responds to the occurrence of an excessive rate of retardation of the rotating member by initiating operation of the motive means and thus the valve, that improvement which comprises means interposed between the motive means and the sensor for interrupting the exertion of force by the motive means in response to the amplitude of oscillation of the mass reaching a limiting maximum amplitude.

9. In an automotive vehicle hydraulic pressure actuated brake for slowing a vehicle wheel and having an anti-lock control including a conduit through which pressurized hydraulic fluid is supplied to a brake, a first valve interposed in the conduit for controllably interrupting and releasing the application of pressure, an oscillating mass-spring actuator for the first valve, and a sensor which responds to the occurrence of an excessive rate of wheel slip by initiating operation of the actuator and first valve, that improvement which comprises a second valve interposed in the conduit intermediate the first valve and the brake, and means for normally maintaining said second valve in pressure conducting condition and operatively connected with the sensor for responding to the occurrence of an excessive wheel slip by conditioning said second valve to block conduction to the brake of increased fluid pressure while allowing hydraulic fluid to flow away from the brake through said second valve.

10. In combination with an anti-lock brake control including a conduit through which pressurized hydraulic fluid is supplied, a first valve interposed in the conduit for controllably interrupting and releasing the application of pressure, an oscillating mass-spring actuator for the first valve, and a sensor which responds to the occurrence of an excessive rate of retardation of a braked member by initiating operation of the actuator and first valve, that improvement which comprises a second valve interposed in the conduit downstream of the first valve, and means for normally maintaining said second valve in pressure conducting condition and operatively connected with the sensor for responding to the occurrence of an excessive rate of retardation by conditioning said second valve to block conduction of increased fluid pressure.

* * * * *